May 24, 1955 K. L. MAGEE ET AL 2,709,086
AUXILIARY POWER UNIT
Filed March 27, 1951 3 Sheets-Sheet 1
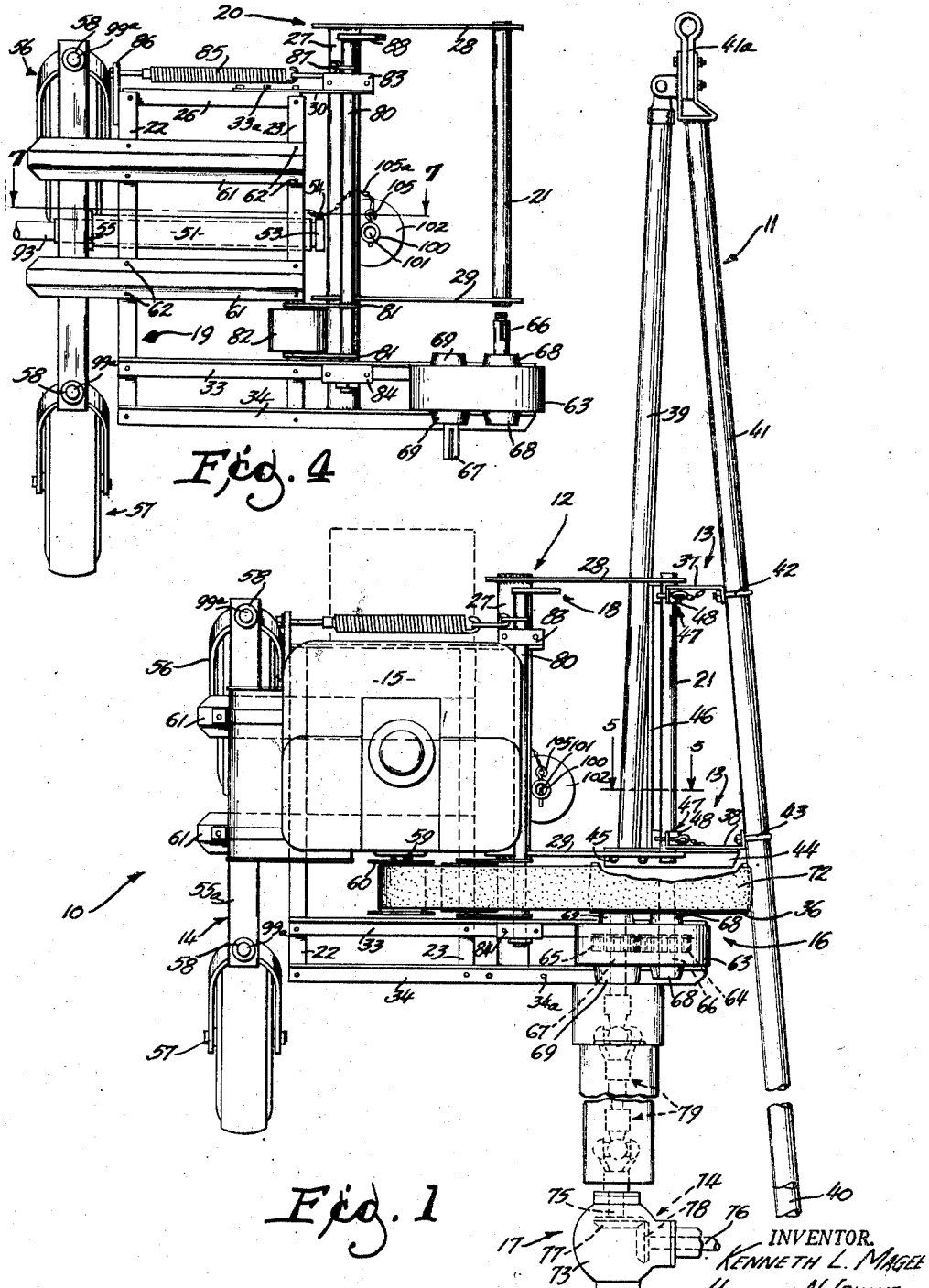

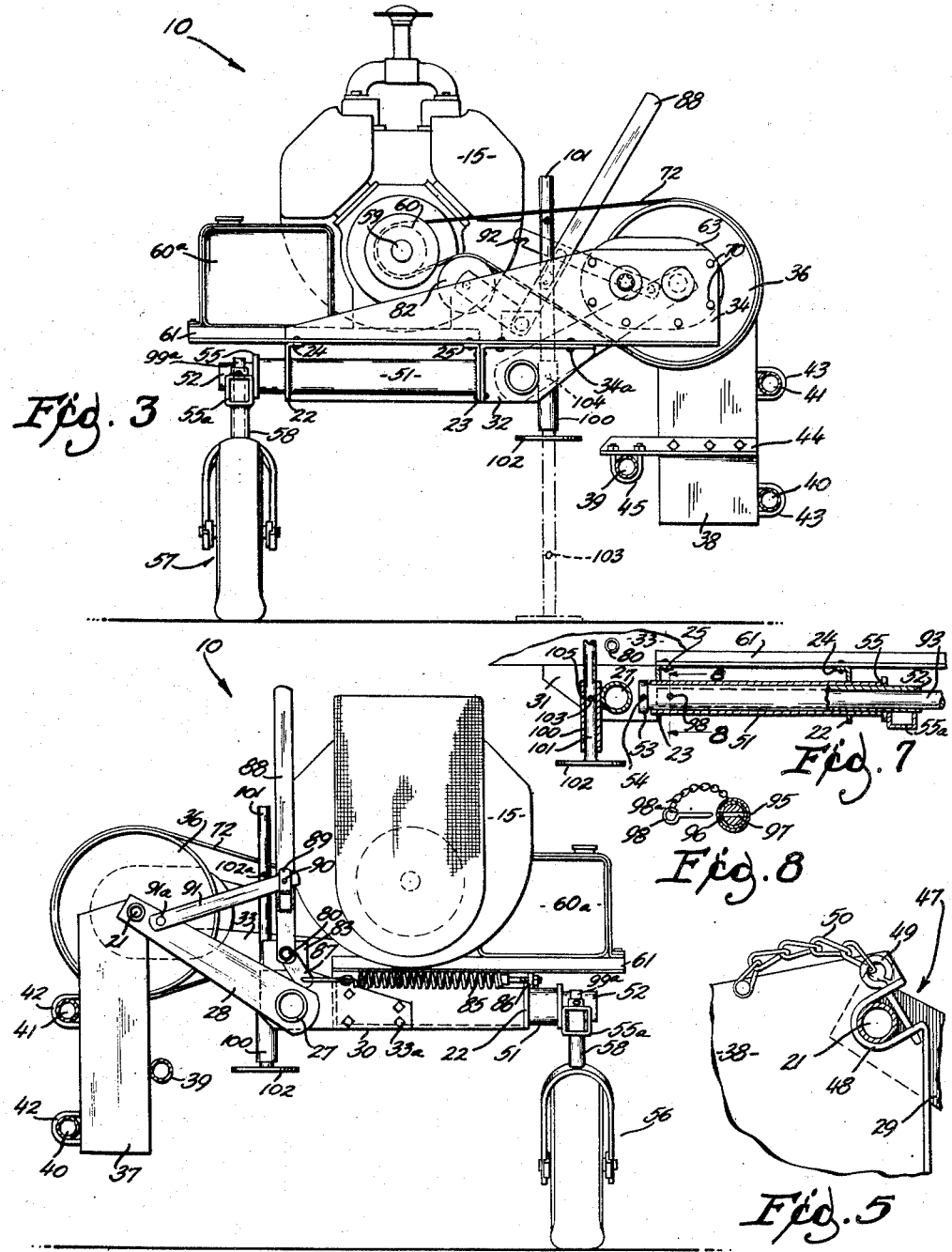

May 24, 1955     K. L. MAGEE ET AL     2,709,086
AUXILIARY POWER UNIT

Filed March 27, 1951     3 Sheets-Sheet 3

INVENTOR.
Kenneth L. Magee & Houston N. Irvine
BY
ATTORNEY

United States Patent Office 2,709,086
Patented May 24, 1955

2,709,086

AUXILIARY POWER UNIT

Kenneth L. Magee and Houston N. Irvine, Burlington, Iowa, assignors to J. I. Case Company, Racine, Wis., a corporation of Wisconsin Application March 27, 1951, Serial No. 217,800

8 Claims. (Cl. 280—423)

The present invention relates to an auxiliary power unit readily attachable to a tractor-propelled combine, or similar type machine of the class having instrumentalities for doing work and commonly connected with the power take-off of the tractor, said power unit driving instrumentalities of the machine at their most efficient speed, with ample power, and independently of the speed of travel of the tractor.

In combine operations it is well known that the operating instrumentalities, for example, the cutting elements, threshing cylinder, blower, etc., must be brought up to a predetermined speed before the machine can be operated effectively without the danger of the machine becoming jammed. In tractor power-take-off driven combines where the tractor is only operative to transmit power to the implement when the tractor is in motion, it is necessary after stopping the combine, to back up the machine a considerable distance in order to allow the above mentioned parts to be brought up to their effective speed before the machine again reaches the grain and the harvesting and threshing operation is started again. In the combining of heavy tangled crops, the tractor frequently does not have the power to drive the operating parts of the implement at their most effective speed while still propelling the implement forwardly, even at a speed sufficiently slow to permit the operating parts of the implement to act upon all of the crop in one pass of the implement. Moreover, in pulling a heavy implement such as a combine up sloping ground, and it becomes necessary to stop the implement, it frequently develops that the tractor does not have sufficient power to start the operating parts and also start the propulsion of the implement simultaneously.

It is, therefore, a primary object of this invention to eliminate the above-mentioned difficulties by providing an auxiliary power unit readily attachable to a combine, or similar type machine, and adapted to drive the operating parts of the implement independently of the speed of the tractor.

Another object of the invention is to provide an auxiliary power unit which imposes a minimum amount of drag on the implement when attached thereto, and which is independently pivotal with respect to the implement.

Another object is to provide an engine-supporting truck with a caster wheel assembly rockable about an axis substantially transverse to the direction of travel of the implement when the truck is attached thereto for movably supporting the truck so that the longitudinal axis thereof is maintained sustantially parallel to the plane of travel of the implement regardless of the irregularities of the ground traversed.

Still another object of the invention is to provide an auxiliary power unit for driving the operating parts of a trailed-behind implement, which upon being detached from the implement, is capable of being used as a portable power unit for general power applications about the farm.

A further object of the invention is to provide a device of this type which can be easily and cheaply manufactured and which will operate at a high degree of efficiency.

Another object is to provide means for converting a power-take-off driven machine into an engine driven machine with a minimum of effort.

Other objects and advantages will become apparent from the following specifications and accompanying drawings of which a satisfactory embodiment of the invention is shown; however, it is to be understood that the invention is not limited to the details disclosed, but includes also all such variations and modifications which fall within the spirit of the invention as herein expressed.

In the drawings:

Fig. 1 is a plan view, with parts broken away, of an auxiliary power unit embodying the present invention operatively connected for driving the instrumentalities of an implement of any well-known or suitable construction, only a portion of which is shown.

Fig. 2 is a front view, with parts in section, of the combination shown in Fig. 1, with parts removed.

Fig. 3 is a rear view, with parts in section, of the combination shown in Fig. 1, with parts removed.

Fig. 4 is a plan view of the auxiliary power unit shown in Fig. 1, with parts removed to more clearly show details of construction.

Fig. 5 is a fragmentary sectional view on the line 5—5 of Fig. 1, with parts removed showing details of construction of the mounting means, slightly enlarged.

Fig. 7 is a sectional view taken on the line 7—7 of Fig. 4, with parts removed.

Fig. 8 is a sectional view taken on the line 8—8 of Fig. 7.

Figure 6:
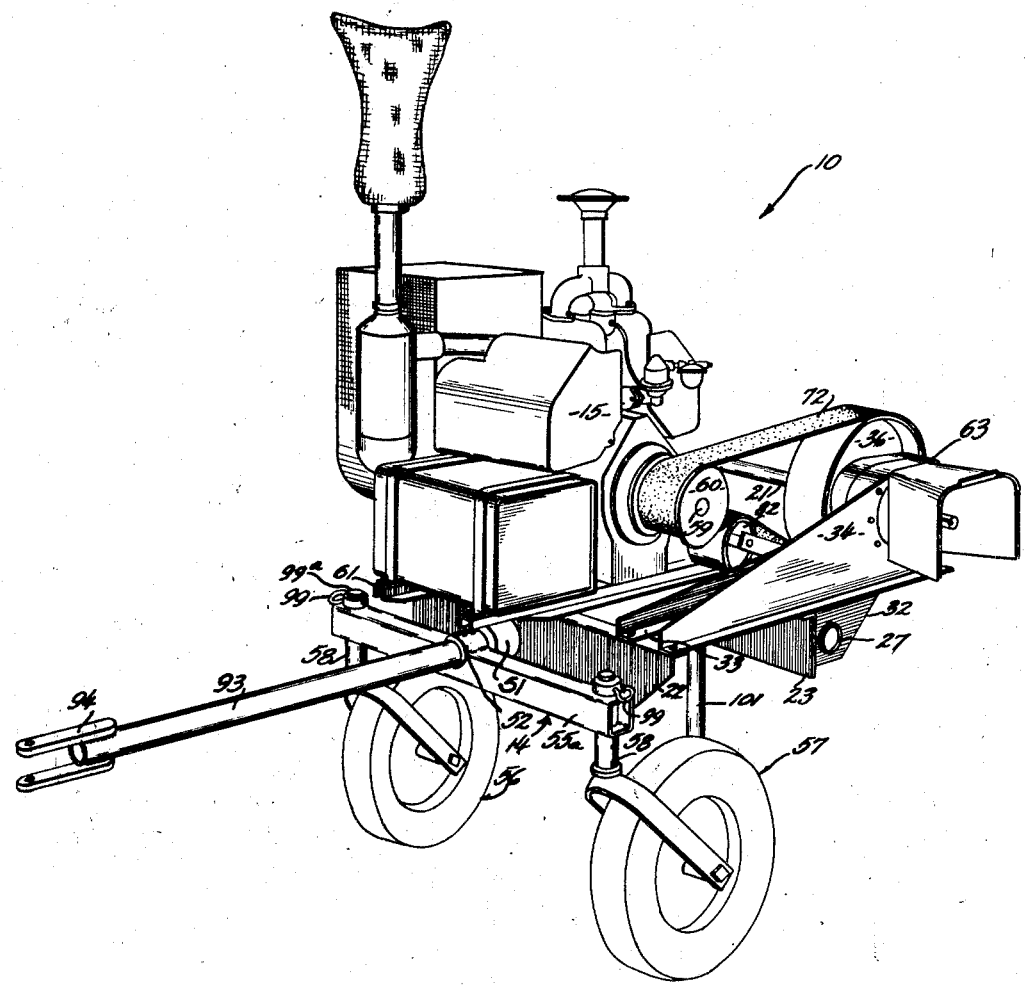
Fig. 6 is a left-front elevational view of the auxiliary power unit detached from the implement and positioned for storage or for use as a portable power source.

Referring to Figs. 1, 2, 3, and 4 of the drawings, an auxiliary power unit, illustrative of the present invention, is designated generally by the number 10 and is shown connected to a drawbar 11 of an implement of any suitable construction having driven instrumentalities, not shown, for doing work, such implement being for example a tractor-drawn harvesting-threshing machine having cutting, threshing, and cleaning mechanisms of well-known construction normally operatively driven from the power-take-off of a tractor or other suitable propelling means all as fully disclosed, for example, in the patent to MacGregor 2,354,346. Auxiliary power unit 10 includes in the present instance an engine supporting truck 12 supported adjacent one side thereof in mounting brackets 13 carried on the implement and movably supported adjacent the other side thereof by means of a caster wheel assembly 14, truck 12 adjusting itself to irregularities in terrain independently of the implement while the implement is being drawn forwardly as will be explained hereinafter, and imposing only a part of its weight on the implement and of this, the portion of such weight being imposed on a part of the implement which is designed and adapted to sustain substantial stresses. An internal combustion engine or other suitable power source 15 of any conventional or suitable construction is carried by supporting truck 12 and operatively connected by means of a transmission 16 to an implement transmission 17 for driving the various instrumentalities of the implement. An idler and throwout 18 is provided for interrupting the transmission of power from engine 15 to transmission 17 of the implement as will appear hereinafter.

More specifically engine supporting truck 12 includes in the present instance an engine supporting frame 19, Fig. 4, and a supporting frame 20 having a pivot 21 rigidly secured thereto for pivotally supporting truck 12 for pivotal movement with respect to the implement in a plane substantially transverse to the direction of travel of the implement. Engine supporting frame 19 includes in the present instance forwardly and rearwardly extending side members 22 and 23 having mounting flanges 24 and 25 respectively, (see also Fig. 7). An end member 26 is secured as by welding or the like adjacent the forward ends of members 22 and 23 so as to form with members 22 and 23 a rearwardly open substantially U-shaped framework.

Supporting frame 20, in the present instance, comprises pivot 21 as previously suggested and a tubular member 27 held in substantially parallel relationship with respect to pivot 21 by means of suitable supporting arms 28 and 29. Arm 28 is fixed as by welding or any other suitable means substantially adjacent the forward end of pivot 21 and tubular member 27, and arm 29 is fixed as by welding or the like substantially adjacent the rearward end of pivot 21 and to tubular member 27 at a point remote from the rearward end thereof. Tubular member 27 is non-rotatably supported adjacent to and substantially parallel with side member 23 by means of brackets 30, 31, and 32, Figs. 7 and 3, bracket 30 being secured to end member 26 by means of bolts or the like 33a and the brackets 31 and 32 being secured beneath side member 23 adjacent the rearward end thereof and to transmission supporting brackets 33 and 34 respectively by means of bolts or other suitable means as 34a. It will be noticed that tubular member 27 is fixed, as by welding or the like, in brackets 30, 31, and 32 so that the axis of pivot 21 is positioned substantially above the axis of tubular member 27, this as will be more fully described hereinafter, providing for rotatably carrying a driven pulley 36 of transmission 16 in substantially coaxial relationship with pivot 21 while still providing an engine supporting frame having a center of gravity sufficiently low to ensure stability in operation over uneven terrain.

Turning to Figs. 1, 2, and 3, mounting brackets 13 are secured to drawbar 11 of the implement, as previously suggested, the drawbar 11 being in the present instance of conventional construction well known in the art and including forwardly converging tubular members 39, 40, and 41 secured forwardly to a suitable connection 41a for attachment to a tractor not shown, members 40 and 41 conveniently lying in substantially the same vertical plane. Mounting brackets 13 include in the present instance a pair of upwardly extending brackets 37 and 38 of substantially channel construction, bracket 37 being positioned between members 39, 40, and 41 of drawbar 11 and secured to members 40 and 41 by means of suitable U-bolts or the like 42 so as to rigidly hold bracket 37 in a substantially upright position. Bracket 38 is similarly secured to members 40 and 41 of drawbar 11 by means of suitable U-bolts or the like 43 and is provided with a laterally extending angle member 44 which is secured to member 39 of drawbar 11 by means of a U-bolt 45, U-bolts 43 and 45 rigidly holding bracket 38 in an upright position and substantially parallel to mounting bracket 37. Suitable stabilizing members 46 are secured between brackets 37 and 38 for well-known purposes. Brackets 37 and 38 are each provided with a saddle 47 for reception of pivot 21 adjacent arms 28 and 29, (see also Fig. 5). Saddles 47 are formed of fore and aft extending flanges 48 so as to provide a suitable bearing surface for pivot 21 and suitable pins 49, connected to chains 50, which in turn are connected to the respective brackets 37 and 38, are provided for insertion in aligned openings formed adjacent the respective ends of flanges 48 for locking pivot 21 in bearing relationship in saddles 47. Chains 50, as will be understood, prevent loss of pins 49 when removed from flanges 48. It will now be apparent that the portion of the weight of the attachment which is imposed on the implement is applied to the strongest part of the implement, namely the drawbar, and less substantial parts, not intended to carry such loads, are not burdened with the weight of an engine.

The caster wheel assembly 14 includes in the present instance a transverse tubular member 51 secured as by welding or any other suitable means in side members 22 and 23 substantially midway intermediate the ends thereof. A tubular member 52 is journaled in member 51 and prevented from moving axially in member 51 by means of a stop or collar 53 secured adjacent the inner end of member 52 by means of a bolt or the like 54 and by means of a ring 55 fixed adjacent the lateral end of member 52 by welding or the like, the stop 53 and ring 55 being positioned on member 52 so as to abut the respective ends of tubular member 51. A rocking beam 55a of tubular construction is secured as by welding or the like, substantially intermediate the ends thereof to member 52 adjacent ring 55 and carries adjacent the ends thereof suitable caster wheels 56 and 57 in suitable bearing sleeves 58, bearing sleeves 58 being secured as by welding or the like substantially normal to rocking beam 55a and adjacent the respective ends thereof. It will be appreciated that permitting rocking beam 55a to rock about the axis of member 51 so as to allow the caster wheels 56 and 57 to respectively follow the irregularities in terrain, relieves frames 19 and 20 and mounting brackets 13 from substantially all binding or twisting forces while ensuring that the longitudinal axis of the truck is maintained substantially parallel to the ground being traversed.

The engine 15 can be of any conventional or suitable construction and has a driving shaft 59 extending therefrom for carrying a driving pulley 60 adjacent the end thereof. The engine, as well as fuel tank 60a, is carried on a pair of parallel channel irons 61 which are secured to members 22 and 23 by means of bolts or other suitable means 62. The pulley 60 is operatively connected to transmission 16 for imparting the driving force of engine 15 to the instrumentalities of the implement by means of transmission 17 as previously suggested.

Transmission 16 includes in the present instance, a suitable gear box 63 having enclosed therein suitable intermeshing gears 64 and 65 secured adjacent the ends of an input shaft 66 and an output shaft 67 respectively. Input shaft 66 is rotatably secured in gear box 63, so as to extend forwardly therefrom, by means of suitable bearings 68 while output shaft 67 is rotatably secured in gear box 63, so as to extend substantially rearwardly therefrom, by means of suitable bearings 69. Gear box 63 is carried between the supporting brackets 33 and 34 adjacent the ends thereof by means of bolts or other suitable fastening means 70 so as to position gear box 63 so that input shaft 66 is substantially co-axial with pivot 21 as previously suggested. The driven pulley 36, of any suitable construction, is secured adjacent the forward end of input shaft 66 and is operatively connected to driving pulley 60 by means of a suitable belt or the like 72. It will be appreciated that the positioning of gear box 63 so that input shaft 66 is substantially co-axial with pivot 21 allows the supporting truck 12 to pivot about the saddles 47 of mounting brackets 13 without appreciable bodily movement of the relatively large pulley, and which might otherwise inadvertently contact frame pipe 41 or other parts of the implement to which the auxiliary power unit is attached, as a result of normal rocking of the unit on rough ground.

Transmission 17 includes in the present instance a gear box 73 enclosing a gear train 74 of any suitable or well-known type, an input shaft 75 and an output shaft 76 which is operatively connected for driving the instrumentalities of the implement, not shown and not considered as a part of the present invention. Gear train 74, while capable of being any suitable construction is preferably formed in the present instance of a bevel gear 77 secured to input shaft 75 and in meshed relationship with a bevel gear 78 secured to output shaft 76. The input shaft 75 and above-mentioned output shaft 67 are operatively connected by means of a universal joint shaft of any well-known or suitable construction generally designated as 79.

It is to be noted that joint shaft 79 occupies a position equivalent to the usual power-take-off shaft common on implements of this general class and usually extending along the drawbar for connection to the tractor (not shown) and that all that is necessary to convert such an implement from a power-take-off to an engine driven type is to remove the usual drive shaft, whatever type it may be, back to transmission 17, apply saddle members 37 and 38, place engine unit 10 in position and connect joint shaft 79. It will be noted that no substantial amount of weight is imposed on the implement, which is commonly lightly constructed, the parts of unit 10 being so arranged that most of the weight of the same is carried on the wheel truck 14, independently of the implement.

The combination drive idler and throwout 18 is provided for interrupting the transmission of motion by belt 72 from the engine 15 to the transmission 16 and consequently to the transmission 17 of the implement as previously suggested. The idler and throwout mechanism 18 includes in the present instance a shaft 80 having aligned arms 81 secured adjacent one end thereof as by welding or the like for rotatably carrying an idler pulley 82 therebetween. The shaft 80 is rotatably carried in suitable bearings 83 and 84 secured respectively to the brackets 30 and 33 so as to position the idler pulley 82 in the plane of movement of the belt 72. The idler pulley 82 is yieldingly held in frictional engagement with the belt 72 by means of a tension spring 85 anchored between a bracket 86 secured to and extending forwardly from side member 22 and an arm 87 fixed to and extending substantially downwardly from the shaft 80 so that the force exerted by spring 85 tends to bias the shaft 80 for turning in a counterclockwise direction, Fig. 2. It will be appreciated that the force exerted by the spring 85 tending to turn the shaft 80 in a counterclockwise or engaging direction maintains idler pulley 82 in frictional engagement with belt 72 sufficiently to drivingly connect driving pulley 60 to driven pulley 36. It will be further appreciated that sufficient slack is allowed in belt 72 so that when the shaft 80 is turned sufficiently in a clockwise or releasing direction, as seen in Fig. 2, so as to move idler pulley 82 away from the belt 72, that the belt will slip and consequently fail to transmit the rotary motion of the engine to the pulley 36. For turning shaft 80 in such releasing direction a lever 88 is secured adjacent the forward end of the shaft 80 and a guide 89, with a pin or stop 90, is provided thereon. A swingable holdout 91 is pivotally secured to supporting arm 28 by means of a suitable bolt or the like 91a and is provided with a slot 92, Fig. 3, for accommodation of stop or pin 90 when the shaft 80 by means of lever 88 is turned sufficiently in such releasing direction to insert pin 90 in said slot. It will be apparent that the force exerted by the spring tending to turn the shaft 80 in an engaging direction will retain pin 90 in slot 92 and consequently lock shaft 80 against rotation, the idler pulley 82 being swung away from contact with the belt 72 when the shaft 80 is locked against rotation by holdout 91 and belt 72 being sufficiently slack on pulleys 36 and 60 to fail to drive pulley 36. It will be appreciated that the combination drive idler and throwout 18 permits the starting and warming up of engine 15 while the engine is in a non-driving relationship with respect to the operating parts of the implement besides enabling the operator to interrupt the transmission of motion from the engine to implement in case of emergency or for such jobs as greasing the implement, making minor adjustments, etc., which ordinarily take little time, without stopping the engine.

The auxiliary unit can also be easily detached from the implement drawbar and used as a portable power unit for other farm jobs as previously suggested. As best seen in Figs. 6, 7, and 8, a drawbar 93 having the usual connection 94 secured to one end thereof for attachment to a tractor or other suitable propelling means in a well-known manner is provided for insertion in the tubular member 52. Aligned openings 95 and 96, Figs. 8, are formed in the tubular members 51 and 52 respectively, adjacent the inner end thereof, and an opening 97 is formed in the drawbar 93 for reception of a pin 98 when the openings 95, 96, and 97 are in registry for securing drawbar 93 in tubular member 52 against axial movement and for preventing rocking movement of rocking beam 55a about the axis of member 51, engine supporting frame 19 being positioned in a plane substantially parallel to the horizontal. Pin 98 is connected to a suitable chain 98a which in turn may be secured adjacent stop 53 by means of bolt 54. Suitable pins or the like 99 are provided for insertion in aligned openings formed in the bearing sleeves 58 and the respective hinge pins or shanks 99a of caster wheels 56 and 57 for locking said caster wheels against castering in the bearing sleeves 58 for positioning the wheels for running in the direction of travel of the tractor when the latter is connected to drawbar 93.

In operation, the auxiliary power unit, when pivotally attached to the drawbar of the implement, drives the operating parts of the implement at their most efficient speed independently of the speed of the tractor. It will be appreciated that the machine can be propelled at a faster speed when harvesting a light crop, and at a slower rate when harvesting a heavy crop without changing the rate of operation of the crop, and that when the crop is tangled or down, the forward movement of the implement can be stopped without stopping the crop treating operation. The cutting, threshing, and cleaning or other crop treating mechanisms of the implement are therefore, independently under control as to speed while the whole of the implement may be propelled forwardly at a speed commensurate with the condition of the crop being harvested.

When the operator has finished the harvesting operation or if he needs the auxiliary source of power for performing some other job about the farm, he first inserts drawbar 93 in tubular member 52 sufficiently to permit the openings 95, 96, and 97 to be brought into registry. Pin 98 is next inserted in aligned openings 95, 96, and 97 so that rocking beam 55a is locked against movement about the axis of member 51 and engine supporting frame 12 is positioned substantially parallel to the horizontal. The caster wheels 56 and 57 are then turned so as to position the wheels for running in a direction parallel to the vertical plane of drawbar 93 and the pins 99 are inserted in the openings provided in the bearing sleeves and the respective caster wheels for preventing castering of the wheels as previously described. After attaching connection 94 of drawbar 93 to the tractor in a manner well known in the art, pins 49 are removed from the saddles 47 so that upon forward movement of the tractor the pivot 21 will be permitted to move out of the saddles, the universal coupling 79 having previously been disconnected from the output shaft 67. The auxiliary power unit is now disconnected from the implement and can be transported for performing some other job about the farm. To operatively attach the auxiliary power unit to the implement requires a mere reversal of the above-listed steps and the implement is again ready for operation. It will be appreciated that since no bolts or other means requiring the use of tools are employed for pivotally securing the auxiliary power unit to the implement, the unit can be quickly operatively connected to the implement or removed therefrom for use as a portable power source.

A substantially vertically extending sleeve 100 is fixed to tubular member 27 as by welding or the like substantially equi-distant from the caster wheels 56 and 57 respectively. A leg 101, preferably tubular in form provided with a disk or foot portion 102 welded or otherwise fixed to the lower end thereof is telescopically inserted in sleeve 100. Aligned openings 102a and 103 are formed in the leg 101 and aligned openings 104 are formed in sleeve 100 whereby leg 101 can be locked against axial movement in sleeve 100 by means of a pin 105 when either openings 102a and 104 are in registry or when openings 103 and 104 are in registry. Openings 102a and 103 are so located on leg 101 as to position the leg in a lowered position with respect to the ground in the sleeve 100 when openings 102a and 104 are in registry. Openings 103 are so located on leg 101 as to position the leg in a raised position with respect to the ground when the openings 103 and 104 are in registry. In operation the leg 101 is locked in sleeve 100 in a raised position by insertion of pin 105 in registered openings 103 and 104 so that the leg does not interfere with the movement of the auxiliary power unit when the unit is either operatively connected to the implement or transported as a portable power unit. When the unit is placed in storage the leg is locked in its lowered position by insertion of pin 105 in registered openings 102a and 104. It will be appreciated that the leg is so positioned with respect to the caster wheels 56 and 57 and with respect to the weight of the power unit as to support truck 12 and engine 15 in a stable manner in a plane substantially parallel to the horizontal. To prevent pin 105 from being lost, a chain 105a is provided for connecting the pin to bolt 54.

While a preferred embodiment of the invention has been shown and described, various changes and rearrangements of the details shown herein may be made without departing from the spirit of the invention, the scope of which is defined in the appended claims.

We claim:

1. A tractor drawn portable power unit comprising an engine, a rigid truck for carrying said engine, a tubular member fixed with said truck and extending in the line of draft of said tractor, a caster wheel assembly for movably supporting said truck, said caster wheel assembly including a tubular member journaled in the first mentioned tubular member, a rocking beam secured adjacent one end thereof, bearing sleeves adjacent the respective ends of said rocking beam, caster wheels journaled in said bearing sleeves, means for preventing axial movement of the second mentioned tubular member in said first mentioned tubular member, means for preventing rotation of said second mentioned tubular member in said first mentioned tubular member for positioning said truck substantially parallel to the horizontal, a drawbar inserted in said second mentioned tubular member for draft connection to said tractor, means for locking said drawbar against axial movement in said second mentioned tubular member, and means for locking said caster wheels against castering in said bearing sleeves for positioning the wheels for running in the direction of travel of said tractor.

2. A tractor drawn portable power unit comprising an engine, a rigid truck for carrying said engine, a tubular member fixed with said truck and extending in the line of draft of said tractor said tubular member having aligned openings formed therein, a caster wheel assembly for movably supporting said truck, said caster wheel assembly including a tubular member journaled in the first mentioned tubular member, the second mentioned tubular member having aligned openings formed therein, a rocking beam secured adjacent one end thereof, bearing sleeves adjacent the respective ends of said rocking beam, caster wheels journaled in said bearing sleeves, means for preventing axial movement of said second mentioned tubular member in said first mentioned tubular member for positioning the openings formed in said second mentioned tubular member axially in registry with the openings formed in said first mentioned tubular member, said openings being in registry when the truck is positioned on level ground and substantially parallel to the horizontal, a drawbar inserted in said second mentioned tubular member for draft connection to said tractor said drawbar having an opening formed therein for registry with said openings formed in said first mentioned tubular member and in said second mentioned tubular member, a pin for insertion in said registered openings for locking said second mentioned tubular member against rotation in said first mentioned tubular member and for locking said drawbar against axial movement in said second mentioned tubular member, and means for locking said caster wheels against castering in said bearing sleeves for positioning the wheels for running in the direction of travel of said tractor.

3. A tractor drawn portable unit comprising a rigid truck, a caster wheel assembly for movably supporting said truck and connected thereto for rocking movement about an axis parallel to the line of draft of said tractor, said caster wheel assembly including a rocking beam, and a pair of wheels for movably supporting said rocking beam means for preventing axial movement of said rocking beam relative to said truck, means for preventing rocking of said caster wheel assembly relative to said truck for positioning said truck substantially parallel to the horizontal, and a drawbar co-axially positioned relative to the axis of rocking movement of said caster wheel assembly and fixed against axial movement relative to said truck for draft connection to said tractor.

4. A tractor drawn portable unit comprising a rigid truck, a caster wheel assembly for movably supporting said truck and connected thereto for rocking movement about an axis parallel to the line of draft of said tractor, said caster wheel assembly including a rocking beam, and a pair of wheels disposed on opposite sides of said axis and movably supporting said rocking beam, means for preventing axial movement of said rocking beam relative to said truck, means for preventing rocking of said caster wheel assembly relative to said truck for positioning said truck substantially parallel to the horizontal, and a drawbar co-axially positioned relative to the axis of rocking movement of said caster wheel assembly and fixed against axial movement relative to said truck for draft connection to said tractor.

5. A tractor drawn portable unit comprising a rigid truck, a caster wheel assembly for movably supporting said truck and connected thereto for rocking movement about an axis parallel to the line of draft of said tractor, said caster wheel assembly including a rocking beam, bearing sleeves adjacent the respective ends of said rocking beam, and caster wheels journaled in said bearing sleeves, means for preventing axial movement of said rocking beam relative to said truck, means for preventing rocking of said caster wheel assembly relative to said truck for positioning said truck substantially parallel to the horizontal, and a drawbar co-axially positioned relative to the axis of rocking movement of said caster wheel assembly and fixed against axial movement relative to said truck for draft connection to said tractor.

6. A tractor drawn portable power unit comprising an engine, a rigid truck for carrying said engine, a caster wheel assembly for movably supporting said truck and connected thereto for rocking movement about an axis parallel to the line of draft of said tractor, said caster wheel assembly including a rocking beam, bearing sleeves adjacent the respective ends of said rocking beam, and caster wheels journaled in said bearing sleeves, means for preventing axial movement of said rocking beam relative to said truck, means for preventing rocking of said caster wheel assembly relative to said truck for positioning said truck substantially parallel to the horizontal, and a drawbar co-axially positioned relative to the axis of rocking movement of said caster wheel assembly and fixed against axial movement relative to said truck for draft connection to said tractor.

7. A tractor drawn portable unit comprising a rigid truck, a tubular member fixed with said truck and extending in the line of draft of said tractor, a caster wheel assembly for movably supporting said truck, said caster wheel assembly including a tubular member journaled in the first mentioned tubular member, a rocking beam secured adjacent one end thereof, bearing sleeves adjacent the respective ends of said rocking beam, caster wheels journaled in said bearing sleeves, means for preventing axial movement of the second mentioned tubular member in said first mentioned tubular member, means for preventing rotation of said second mentioned tubular member in said first mentioned tubular member for positioning said truck substantially parallel to the horizontal, a drawbar inserted in said second mentioned tubular member for draft connection to said tractor, means for locking said drawbar against axial movement in said second mentioned tubular member, and means for locking said caster wheels against castering in said bearing sleeves for positioning the wheels for running in the direction of travel of said tractor.

8. A tractor drawn portable unit comprising a rigid truck, a tubular member fixed with said truck and extending in the line of draft of said tractor said tubular member having aligned openings formed therein, a caster wheel assembly including a tubular member journaled in the first mentioned tubular member, the second mentioned tubular member having aligned openings formed therein, a rocking beam secured adjacent one end thereof, bearing sleeves adjacent the respective ends of said rocking beam, caster wheels journaled in said bearing sleeves, means for preventing axial movement of said second mentioned tubular member in said first mentioned tubular member for positioning the openings formed in said second mentioned tubular member axially in registry with the openings formed in said first mentioned tubular member, said openings being in registry when the truck is positioned on level ground and substantially parallel to the horizontal, a drawbar inserted in said second mentioned tubular member for draft connection to said tractor, said drawbar having an opening formed therein for registry with said openings formed in said first mentioned tubular member and in said second mentioned tubular member, a pin for insertion in said registered openings for locking said second mentioned tubular member against rotation in said first mentioned tubular member and for locking said drawbar against axial movement in said second mentioned tubular member, and means for locking said caster wheels against castering in said bearing sleeves for positioning the wheels for running in the direction of travel of said tractor.

References Cited in the file of this patent

UNITED STATES PATENTS

| | | |
|---|---|---|
| 1,157,056 | Stone | Oct. 19, 1915 |
| 1,228,138 | Rogers | May 29, 1917 |
| 1,319,235 | Messersmith | Oct. 21, 1919 |
| 1,475,223 | Cushman | Nov. 27, 1923 |
| 2,349,361 | MacDonald | May 23, 1944 |
| 2,354,346 | MacGregor | July 25, 1944 |
| 2,401,183 | Pool et al. | May 28, 1946 |
| 2,436,556 | Daugherty | Feb. 24, 1948 |
| 2,457,745 | Suess | Dec. 28, 1948 |
| 2,477,795 | Gehl | Aug. 2, 1949 |
| 2,499,148 | Lichtenberg | Feb. 28, 1950 |

FOREIGN PATENTS

| | | |
|---|---|---|
| 875,325 | France | Sept. 16, 1942 |